US012348919B2

(12) United States Patent
Welti et al.

(10) Patent No.: US 12,348,919 B2
(45) Date of Patent: Jul. 1, 2025

(54) INSERT FOR HEADPHONE MEASUREMENTS ON A HEAD SHAPED FIXTURE

(71) Applicant: Harman International Industries, Incorporated, Stamford, CT (US)

(72) Inventors: Todd S. Welti, Thousand Oaks, CA (US); Christian Manuel Garcia, Winnetka, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 186 days.

(21) Appl. No.: 18/299,998

(22) Filed: Apr. 13, 2023

(65) Prior Publication Data

US 2024/0348958 A1 Oct. 17, 2024

(51) Int. Cl.
*H04R 1/04* (2006.01)

(52) U.S. Cl.
CPC .................................... *H04R 1/04* (2013.01)

(58) Field of Classification Search
CPC ........................................................ H04R 1/04
See application file for complete search history.

(56) References Cited

U.S. PATENT DOCUMENTS

| | | | | |
|---|---|---|---|---|
| 11,095,994 | B2 * | 8/2021 | Andersson | H04R 25/606 |
| 2014/0121451 | A1 * | 5/2014 | Kasic | H04R 25/606<br>600/25 |
| 2015/0257683 | A1 * | 9/2015 | Ashmore | A61B 5/0022<br>600/559 |
| 2019/0014427 | A1 * | 1/2019 | Freels | H04R 25/652 |
| 2019/0037324 | A1 * | 1/2019 | Darlington | H04R 29/00 |
| 2019/0182594 | A1 * | 6/2019 | Oswald | H04S 7/303 |
| 2021/0329394 | A1 * | 10/2021 | Hansen | H04R 1/025 |

* cited by examiner

*Primary Examiner* — Oyesola C Ojo
(74) *Attorney, Agent, or Firm* — Burris Law, PLLC

(57) ABSTRACT

An insert for headphone measurements on a head-shape fixture includes a body and a coupler. The body is configured to engage at least a portion of the headphones. The body also defines an opening that is configured to receive a pinna on the head-shape fixture. The body has a variable stiffness. The coupler attaches the body to the head-shape fixture.

20 Claims, 4 Drawing Sheets

INSERT FOR HEADPHONE MEASUREMENTS ON A HEAD SHAPED FIXTURE

FIELD

Figure 1:
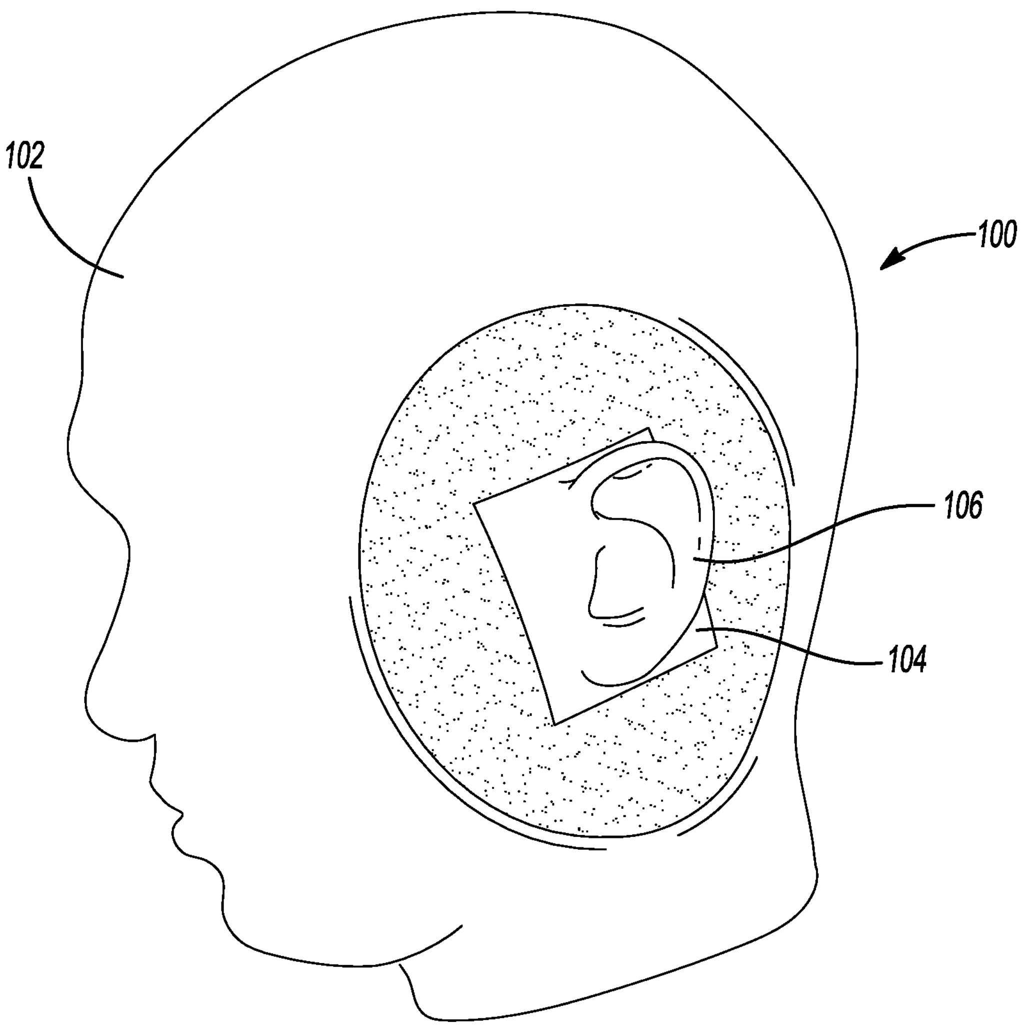

The present disclosure relates to measurements of headphones. More specifically, the present disclosure relates to an insert for headphone measurements.

BACKGROUND

The statements in this section merely provide background information related to the present disclosure and may not constitute prior art.

Commercial dummy heads and related fixtures (herein referred to as "fixtures") often do not emulate how headphones fit on real humans, resulting in large audio leaks in the dummy head which do not correspond to leakage in a typical human head. This results in errors in measurement at low frequencies. These errors can be very large, easily 10 dB or more over a broad band of frequencies from 20 to 500 Hz. The cause of these errors is related to the dummy head shape and rigidity because the dummy heads typically are rigid, except for the pinna. Accordingly, the headphones do not settle fully on the fixture.

Headphone leakage effects can have a profound effect on low frequency performance of headphones. Deviations of 20 dB or more in the headphone response can easily result from varying amounts of leakage. For many headphone designs, leakage is still the largest source of variability in perceived low frequency response. Reducing this variability would be the best solution for this problem.

Accordingly, fixtures that more accurately approximates the fitting of headphones on human subjects are desirable.

SUMMARY

This section provides a general summary of the disclosure and is not a comprehensive disclosure of its full scope or all of its features.

In one form of the present disclosure, an insert for headphone measurements on a head-shape fixture includes a body and a coupler. The body is configured to engage at least a portion of the headphones. The body also defines an opening that is configured to receive a pinna on the head-shape fixture. The body has a variable stiffness. The coupler attaches the body to the head-shape fixture.

In variations of the insert of the above paragraph, which may be implemented individually or in any combination: the body has a plurality of sections with different thicknesses; the opening has a rectangular shape; a portion of the body is made of a silicone rubber gel; the silicone rubber gel has a Shore hardness of about 000-34; the body is made of a plurality of materials, each material has a different stiffness; one of the plurality of materials is silicone; one of the plurality of materials is a silicone rubber gel; and a first material of the plurality of materials is silicone and a second material of the plurality of materials is silicone rubber gel.

In another form, the present disclosure provides an insert for headphone measurements on a head-shape fixture that includes a body and a coupler. The body defines an opening that is configured to receive a pinna on the head-shape fixture. The body being made of a plurality of sections. A first section of the plurality of sections is made of a first material and a second section of the plurality of sections is made of a second material that is different than the first material. The coupler attaches the body to the head-shape fixture. The body also includes a plurality of regions. A first region of the plurality of regions is formed entirely by the first material and a second region of the plurality of regions is formed by a combination of the first and second materials.

In variations of the insert of the above paragraph, which may be implemented individually or in any combination: the second material has a greater stiffness than the first material; and the first material in the second region has a first thickness and the second material in the second region has a second thickness that is different than the first thickness.

In yet another form of the present disclosure, an assembly for headphone measurements includes a fixture, an insert, a coupler, and a microphone that detects sounds emanating from a headphone placed on the fixture. The insert is configured to engage at least a portion of the headphones. The insert defines an opening that is configured to receive a pinna on the fixture. The insert having a variable stiffness. The coupler attaches the insert to the fixture.

In variations of the assembly of the above paragraph, which may be implemented individually or in any combination: the insert has a plurality of sections with different thicknesses; a portion of the insert is made of a silicone rubber gel; the silicone rubber gel has a hardness of about 000-34; the insert is made of a plurality of materials, and wherein each material has a different stiffness; one of the plurality of materials is silicone; one of the plurality of materials is a silicone rubber gel; and a first material of the plurality of materials is silicone and a second material of the plurality of materials is a silicone rubber gel.

Further areas of applicability will become apparent from the description provided herein. It should be understood that the description and specific examples are intended for purposes of illustration only and are not intended to limit the scope of the present disclosure.

DRAWINGS

Figure 2:
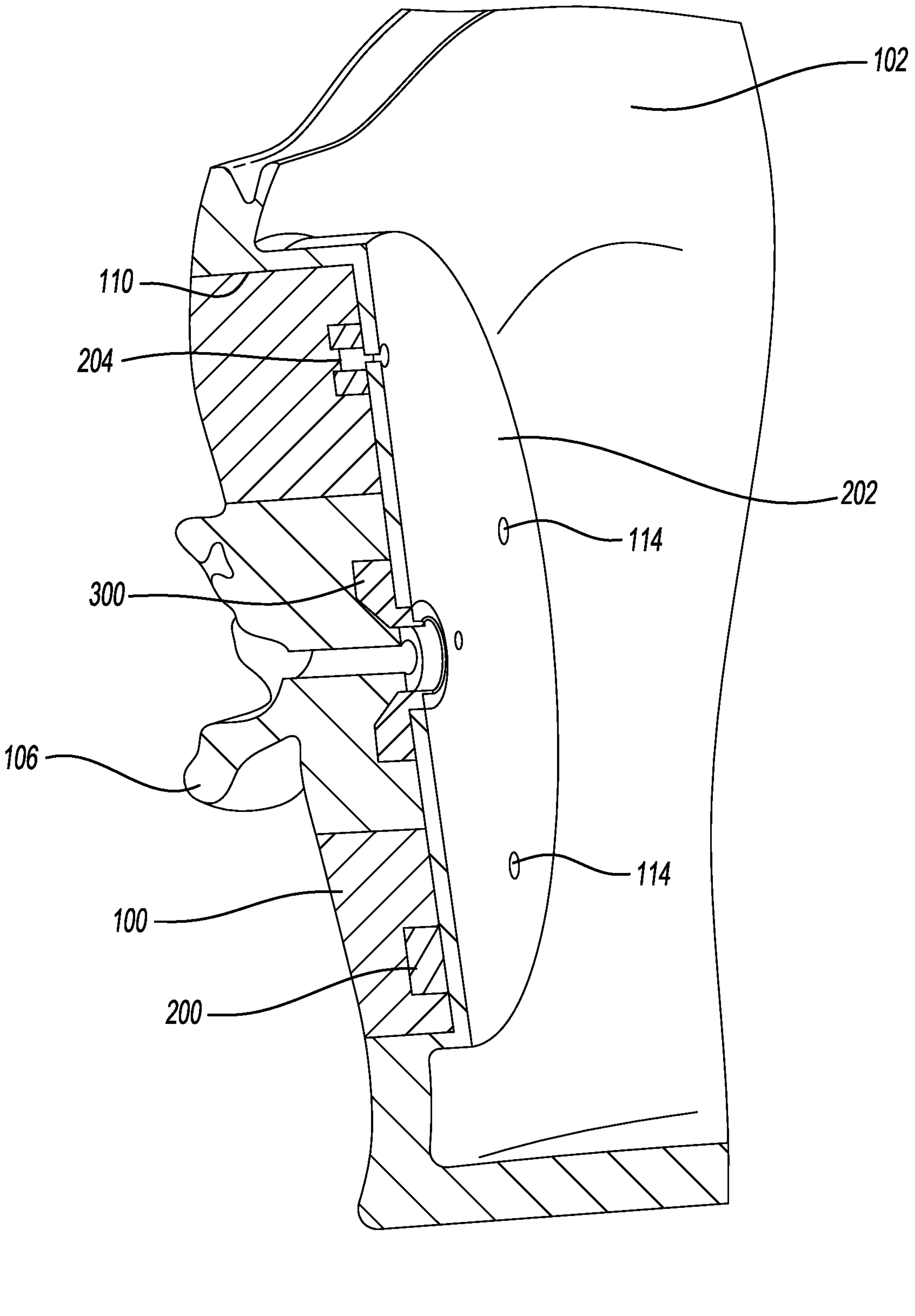
Figure 3:
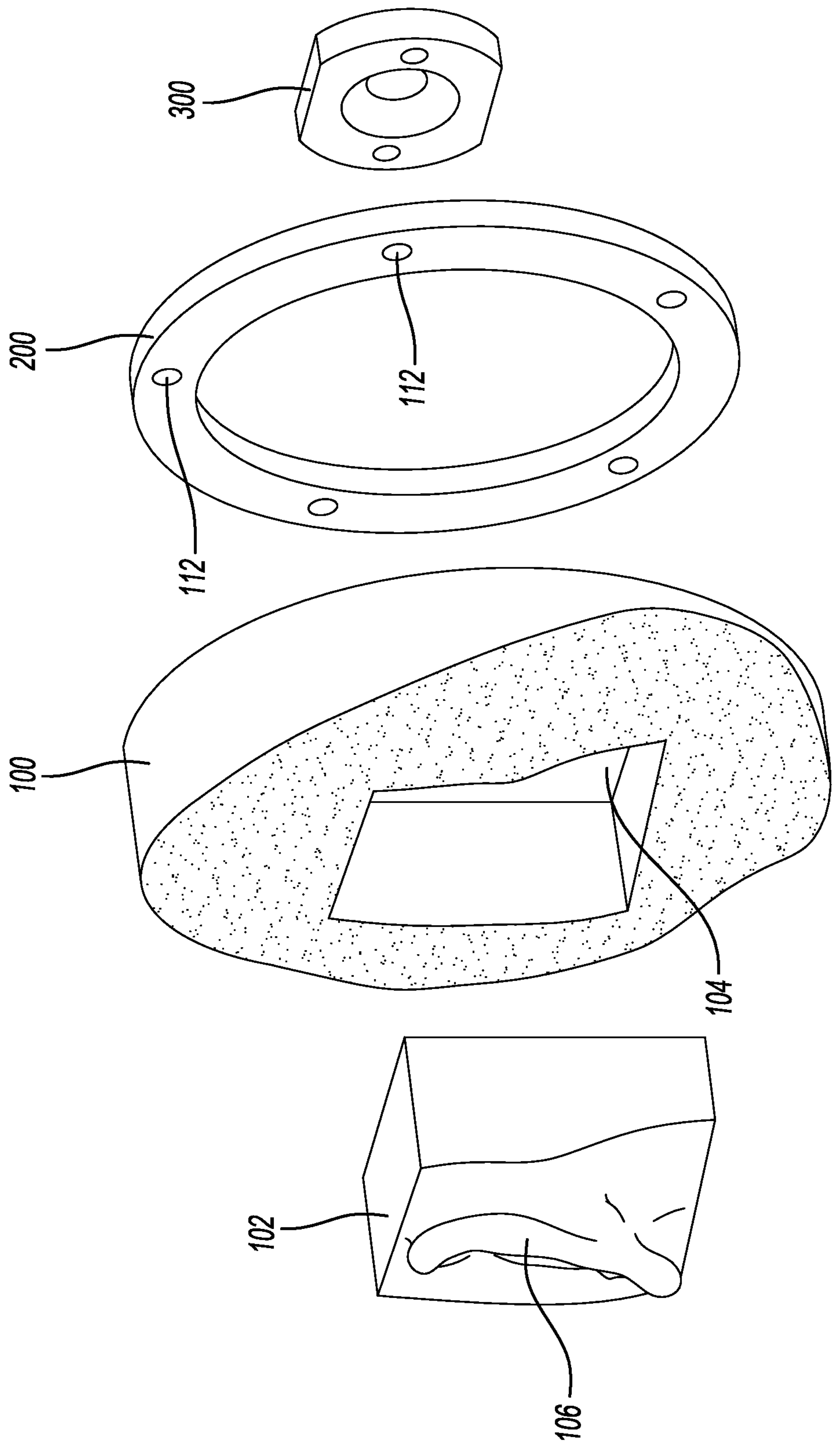
Figure 4:
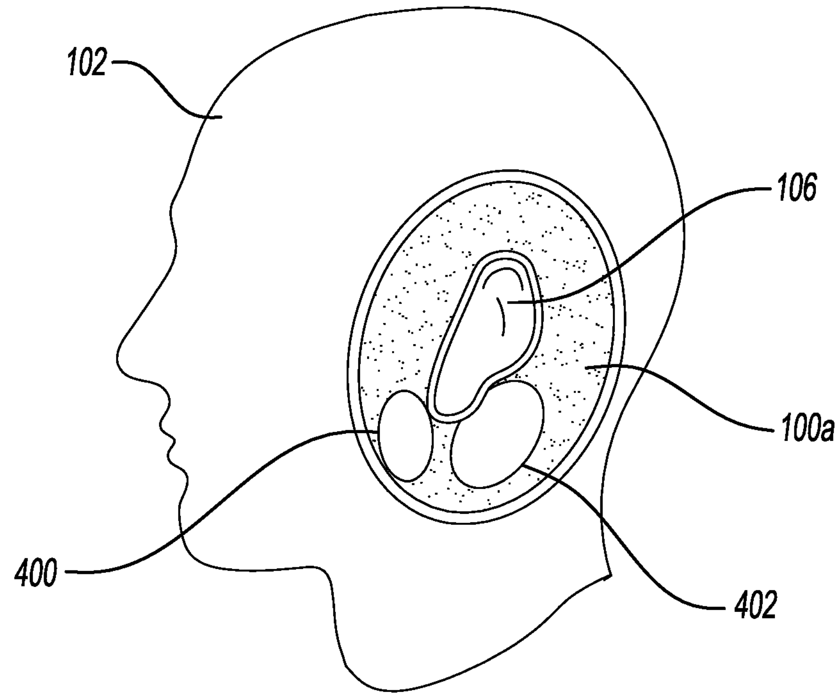
Figure 5:
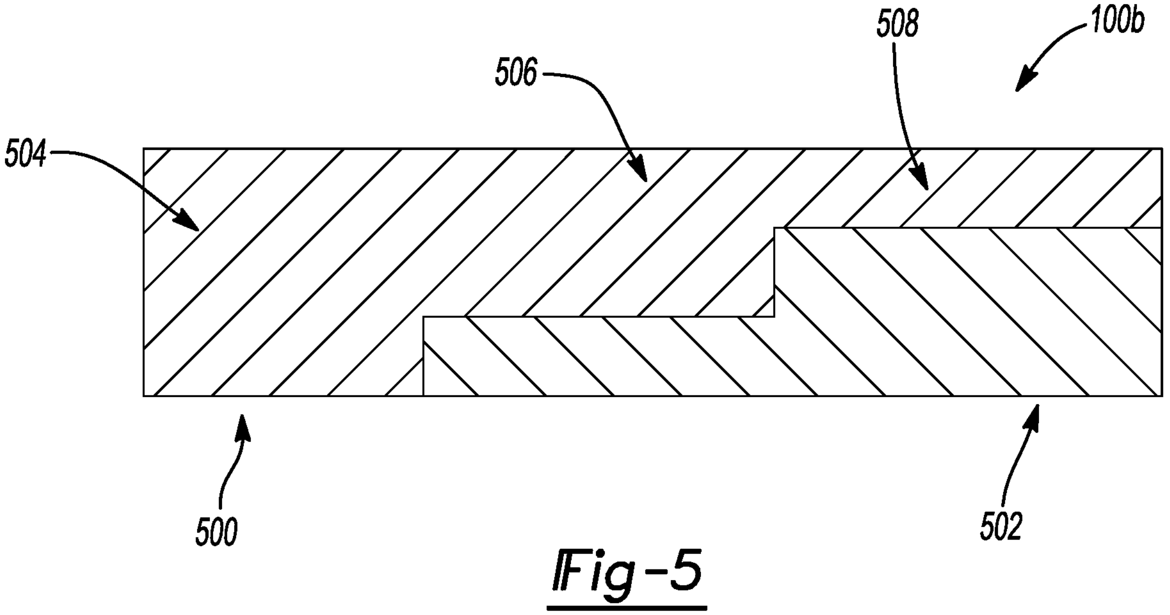

In order that the disclosure may be well understood, there will now be described various forms thereof, given by way of example, reference being made to the accompanying drawings, in which:

FIG. 1. is a perspective view of an insert on a head shaped fixture in accordance with the teachings of the present disclosure;

FIG. 2 is a cross-sectional view of a portion of the fixture shown in FIG. 1 including a coupling mechanism attaching the insert to the fixture in accordance with the teachings of the present disclosure;

FIG. 3. is an exploded view of the insert of FIG. 1 and the coupling mechanism in accordance with the teachings of the present disclosure;

FIG. 4. is a perspective view of another insert with varying stiffness in accordance with the teachings of the present disclosure; and FIG. 5. is a cross sectional view of a portion of another insert in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present disclosure, an insert for headphone measurements on a head-shape fixture includes a body and a coupler. The body is configured to engage at least a portion of the headphones. The body also defines an opening that is configured to receive a pinna on the head-shape fixture. The body has a variable stiffness. The coupler attaches the body to the head-shape fixture. In this way, the head-shape fixture more accurately represents headphones being fitted on a human head, which improves the regulation of leakage of the headphones being measured.

Referring now to FIGS. 1 and 2, there is shown an insert 100 coupled to a fixture 102 in accordance with the teachings of the present disclosure. The fixture 102 emulates the shape and contours of a human head and includes openings 110 (only one shown in FIG. 2) where a respective insert 100 is securely received. In one or more embodiments, the insert 100 has a shape that corresponds to a shape of the respective opening 110 in which the insert 100 is securely received. In the example illustrated, the insert 100 has an oval shape that corresponds to an oval shape of the respective opening 110 of the fixture 102. In some forms, the insert 100 may have a square shape that corresponds to a square shape of the respective opening 110 of the fixture 102. In one or more embodiments, the insert 100 has sections or portions having different thicknesses and/or made of different materials. For example, an upper portion of the insert 100 has a thickness that is greater than a thickness of a lower portion of the insert 100. In this way, the insert 100 has a variable thickness.

With additional reference to FIG. 3, the insert 100 defines an opening 104 that receives a pinna 106. In the example illustrated, the opening 104 has a generally square shape. In some forms, the opening 104 may an oval shape or any other suitable shape configured to receive the pinna 106. The insert 100 is also attached to a plate 202 of the fixture 102 that at least partially defines the opening 110. In one or more embodiments, the insert 100 is attached to the plate 202 of the fixture 102 using a coupler 200. Specifically, the coupler 200 is attached to the insert 100, and the coupler 200 is attached to the plate 202 with a set of fasteners 204 (e.g., one fastener 204 of the set of fasteners 204 is shown in FIG. 2). In one or more embodiments, the fasteners 204 may include bolts, screws, rivets, pins, or any other suitable attachment structures that can attach the coupler 200 to the plate 202. In the example illustrated, the coupler 200 has a ring shape including apertures 112 extending therethrough. The fasteners 204 extend through the apertures 112 in the coupler 200 and apertures 114 in the plate 202 of the fixture 102, thereby securing the insert 100 and the coupler 200 to the fixture 102. In one or more embodiments, the coupler 200 may have a different shape such as a square shape or an oval shape, for example. The insert 100 is large enough to accommodate headphones (e.g., on-ear headphone sitting at least partially on the insert 100). In some forms, the headphones sit entirely on the insert 100 (i.e., the cups of the headphones do not sit on the fixture 102 and instead sit entirely on or rest against the insert 100). In one or more embodiments, the insert 100 is rectangular or square shaped, for example. That is, in the example illustrated, the insert 100 has an oval shape. In other variations, the insert 100 has a square shape having sides measuring at least 4.5 inches, for example.

Referring to FIG. 3, there is shown an exploded view of the insert 100, a portion of the fixture 102, and the coupler 200. Further, FIG. 3 shows a microphone 300 that receives audio signals from a headphone placed on the fixture 102. The microphone 300 may be located near or adjacent the plate 202 between the plate 202 and the pinna 106 (FIG. 2). The microphone 300 may also be surrounded by the insert 100.

Accordingly, the present disclosure describes an insert 100 in a mannequin or fixture 102 which emulates human head properties. In one or more embodiments, the insert 100 may be made of a material that is different from a material of the fixture 102. That is, the fixture 102 may be made of a more rigid material than the insert 100. For example, the fixture 102 may be made of a plastic or fiberglass material and the insert 100 may be made of a material that is pliable and/or resilient. Materials such as gels (e.g., silicone rubber gels or platinum silicone rubber gels) are sufficiently soft, pliable, resilient and allow controlled and repeatable properties to be incorporated in the fixture design. The disclosure describes a rigid dummy head of typical human proportions, with the insert 100 that goes around the pinna 106. In one or more embodiments, the insert 100 may be made of a gel or any similar material with a Shore hardness in the range of about 000-34, for example. The insert 100 is secured to the fixture 102 so as to maintain the original shape of the head (with no headphones present) while emulating its physical properties, and additionally allows the user to change out the insert 100 for a version with different properties if desired. Stated differently, the insert 100 is interchangeable or removably secured to the fixture 102. In this way, one fixture 102 may be used with a plurality of different inserts.

Referring now to FIG. 4, a variation to this disclosure includes an insert 100*a*. The structure and function of insert 100*a* may be similar or identical to that of insert 100 described above, apart from any exception noted below. The insert 100*a* has a variable stiffness or rigidity. Stated differently, the insert 100*a* may include sections having different Young's modulus values. That is, the insert 100*a* includes sections, which incorporate a silicone material which is not as stiff or rigid as a gel material, to emulate physical properties of the human head at different locations around the ear. For example, a portion 400 of the insert 100*a* representing a cheek bone of a human, which is directly in front of the pinna 106, is made of a gel material, since this area in humans has less bone matter and is thus soft. On the other hand, a portion 402 of the insert 100*a* representing a mastoid process (i.e., the bony part of the skull behind the ear), which is below and slightly to the rear of the pinna 106, utilizes a stiffer or more rigid material such as silicone. In one or more embodiments, the insert 100*a* may also have variable resiliency to emulate physical properties of the human head at different locations around the ear. That is, one section of the insert 100*a* may be more or less resilient than other sections of the insert 100*a*. The design of the insert would take into account the physiology of a range of human skulls.

Referring now to FIG. 5, a variation to this disclosure includes an insert 100*b*. The structure and function of insert 100*b* may be similar or identical to that of inserts 100, 100*a* described above, apart from any exception noted below. The insert 100*b*, in one or more embodiments, is made of multiple sections 500, 502 having different materials. The sections 500, 502 may be secured to each other using an adhesive or any other suitable material. In one or more embodiments, the section 500 may be shaped so as to have a stepped interface and the section 502 may be shaped so as to have a stepped interface that corresponds to the stepped interface of the section 500. The sections 500, 502 may be secured to each other using the adhesive at the stepped interfaces.

The insert 100*b* can include section 500 being made of a first material and section 502 being made of a second material that is different than the first material. In other forms, the insert 100*b* may be made of three or more different materials secured to each other as described above. In one example, the first material may be a gel (e.g., silicone rubber gel) and the second material may be a silicone material that has a greater stiffness and/or rigidity than the first material. As such, the insert 100*b* forms a plurality of regions each being made of one or more materials. In the example illustrated, the insert 100*b* has a soft region 504 formed entirely by the first material and a harder region 508 formed by mostly the second material and some of the first material. In some forms, the harder region 508 may be formed entirely by the second material instead of a combination of the first and second materials. Between the two regions 504 and 508 is an intermediate region 506, which is stiffer and/or more rigid than the soft region 504. The harder region 508 is stiffer and/or more rigid than the intermediate region 506. The intermediate region 506 may be formed by mostly the first material and some of the second material. Stated differently, a thickness of the first material of the intermediate region 506 is greater than a thickness of the second material of the intermediate region 506. Although the insert 100*b* shown in FIG. 5 includes one intermediate region, it should be understood that the insert can include a plurality of intermediate regions having varying stiffnesses and/or thicknesses relative to each other.

The insert 100*b* being made of different materials provides for a more accurate representation of the human head near the ear area, which allows for headphones to settle on the fixture and the insert 100*b* to conform to the cups of the headphones. In this way, the leakage of the headphones being measured is better regulated. The insert 100*b* of the present disclosure may also be made of a plurality of materials such that one or more portions of the insert 100*b* can be compressed one or more millimeters (e.g., 3 or more millimeters). The stiffness and/or resiliency of any region of the insert 100*b* being formed of a plurality of materials may be greater than or less than a region formed entirely of one material.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An insert for headphone measurements of headphones on a head-shape fixture, the insert comprising:

a body configured to engage at least a portion of the headphones, the body defining an opening that is configured to receive a pinna on the head-shape fixture, the body having a variable stiffness and including an outer surface having a portion that is contoured; and a coupler that attaches the body to the head-shape fixture.

2. The insert of claim 1, wherein the body has a plurality of sections with different thicknesses.

3. The insert of claim 1, wherein the opening has a rectangular shape.

4. The insert of claim 1, wherein a portion of the body is made of a silicone rubber gel.

5. The insert of claim 4, wherein the silicone rubber gel has a Shore hardness of about 000-34.

6. The insert of claim 1, wherein the body is made of a plurality of materials, and wherein each material has a different stiffness.

7. The insert of claim 6, wherein one of the plurality of materials is silicone.

8. The insert of claim 6, wherein one of the plurality of materials is a silicone rubber gel.

9. The insert of claim 6, wherein a first material of the plurality of materials is silicone and a second material of the plurality of materials is silicone rubber gel.

10. An insert for headphone measurements on a head-shape fixture, the insert comprising:

a body defining an opening that is configured to receive a pinna on the head-shape fixture, the body being made of a plurality of sections, a first section of the plurality of sections is made of a first material and a second section of the plurality of sections is made of a second material that is different than the first material; and a coupler that attaches the body to the head-shape fixture, wherein the body includes a plurality of regions, a first region of the plurality of regions formed entirely by the first material and a second region of the plurality of regions formed by a combination of the first and second materials.

11. The insert of claim 10, wherein the second material has a greater stiffness than the first material.

12. The insert of claim 10, wherein the first material in the second region has a first thickness and the second material in the second region has a second thickness that is different than the first thickness.

13. An assembly for headphone measurements comprising:

a fixture configured to receive headphones;

an insert configured to engage at least a portion of the headphones, the insert defining an opening that is configured to receive a pinna on the fixture, the insert having a variable stiffness and including an outer surface having a portion that is contoured;

a coupler that attaches the insert to the fixture; and a microphone that detects sounds emanating from a headphone placed on the fixture.

14. The assembly of claim 13, wherein the insert has a plurality of sections with different thicknesses.

15. The assembly of claim 13, wherein a portion of the insert is made of a silicone rubber gel.

16. The assembly of claim 15, wherein the silicone rubber gel has a hardness of about 000-34.

17. The assembly of claim 13, wherein the insert is made of a plurality of materials, and wherein each material has a different stiffness.

18. The assembly of claim 17, wherein one of the plurality of materials is silicone.

19. The assembly of claim 17, wherein one of the plurality of materials is a silicone rubber gel.

20. The assembly of claim 17, wherein a first material of the plurality of materials is silicone and a second material of the plurality of materials is a silicone rubber gel.

* * * * *